F. POMIJE.
BRUSH CUTTER AND GROUND EVENER.
APPLICATION FILED JULY 10, 1919.

1,346,382.

Patented July 13, 1920.
2 SHEETS—SHEET 1.

Witness,
S. P. Buck.

Inventor,
Frank Pomije.
By H. B. Willson & Co.
Attorneys

UNITED STATES PATENT OFFICE.

FRANK POMIJÈ, OF NEW PRAGUE, MINNESOTA.

BRUSH-CUTTER AND GROUND-EVENER.

1,346,382.  Specification of Letters Patent.  Patented July 13, 1920.

Application filed July 10, 1919. Serial No. 309,894.

*To all whom it may concern:*

Be it known that I, FRANK POMIJÈ, a citizen of the United States, residing at New Prague, in the county of Le Sueur and State of Minnesota, have invented certain new and useful Improvements in Brush-Cutters and Ground-Eveners; and I do declare the following to be a full, clear, and exact description of the invention, such as will enable others skilled in the art to which it appertains to make and use the same.

This invention relates to an improved brush cutter and ground evener.

One object of this invention is to provide an improved device of this character which is exceedingly effective and efficient in cutting all kinds of brush, including bushes, briers, weeds and grasses, and especially adapted for razing tufts of grass or peat in old meadows and peat fields.

Another object is to provide a device of this character comprising a frame structure which is exceedingly rigid, strong, durable and compact, consistent with comparatively light weight and slight cost.

Other objects and advantages may become apparent to persons who read the following details of description in connection with the accompanying drawings in which,—

Figure 1:
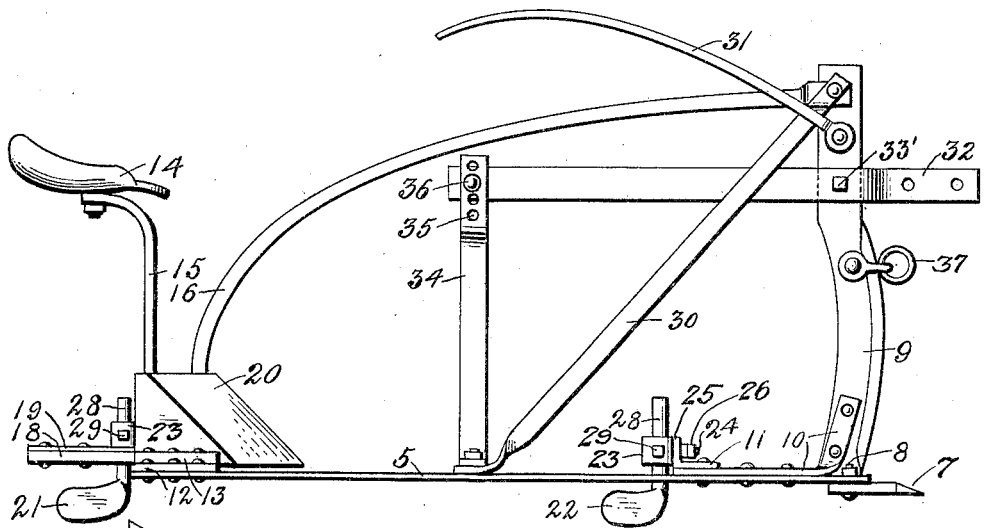
Figure 1 is a side elevation of my improved brush cutting device.
Figure 2:
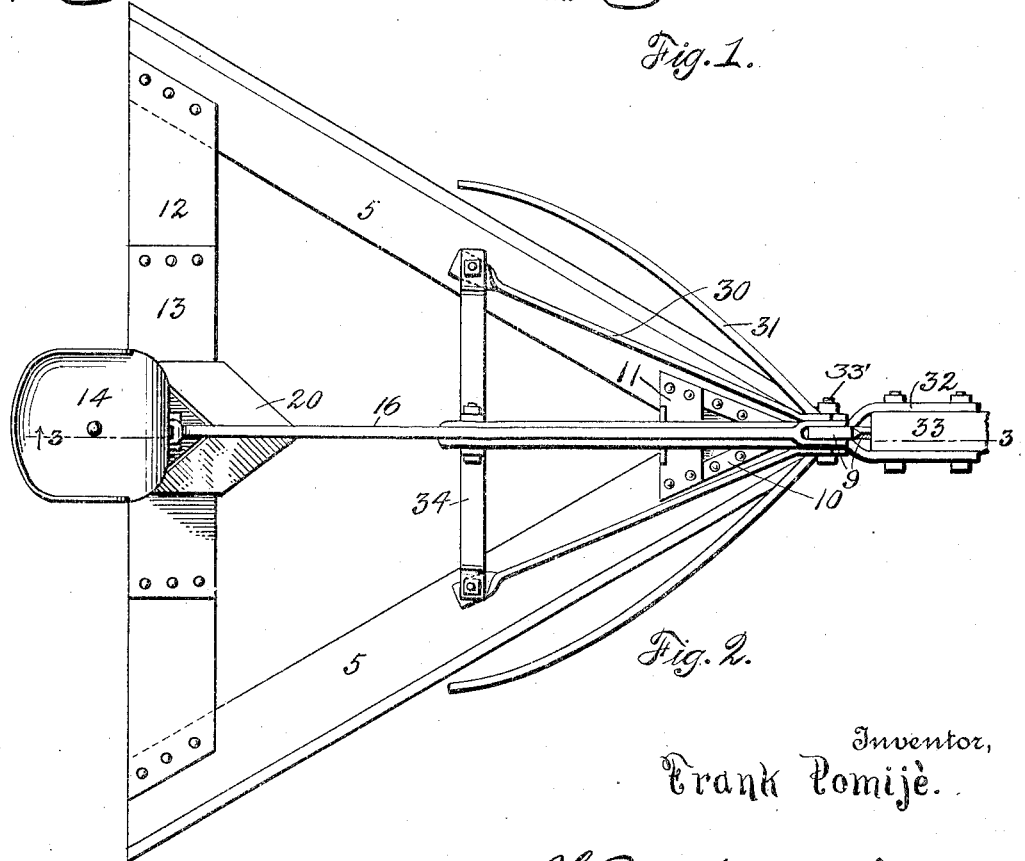
Fig. 2 is a top plan view, one of the tongue members being broken off.
Figure 3:
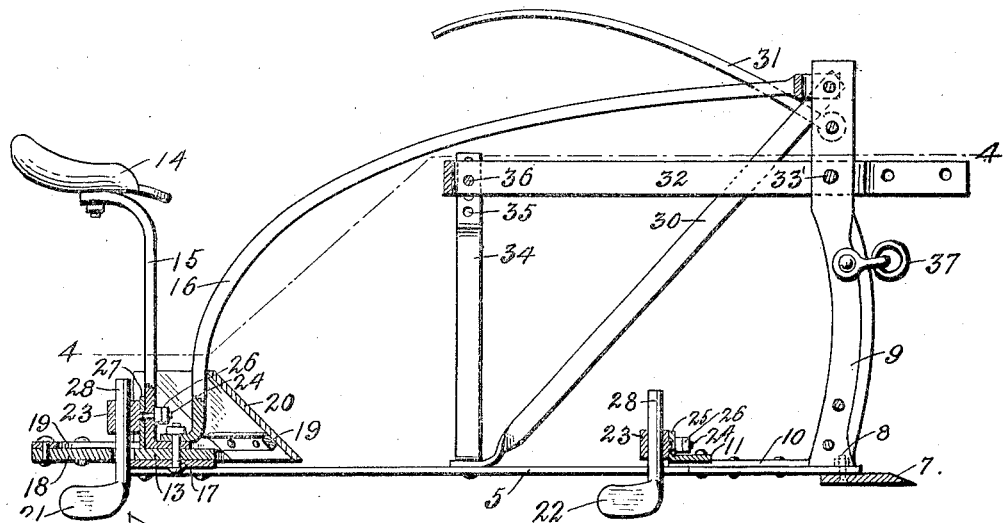
Fig. 3 is a sectional view, the section being taken substantially along the line 3—3 of Fig. 2.

Referring to these drawings in detail, in which similar reference characters correspond with similar parts throughout the several views, the device comprises a rigid frame structure including a pair of rearwardly diverging blades 5 which are joined together at 6 and carry an excavating point or plate 7, this plate being secured to the blades 5 by means of bolts 8. In order that the front ends of the blades 5 may be more securely united with one another, and in order that a substantially vertical blade 9 may be secured to the front ends of the blades 5, a pair of connecting strips or bars 10 are bolted or riveted to the blades 5 and have their front ends turned upward against opposite sides of the blade 9 and are bolted or riveted thereto. As a still further means of rigidly uniting the front ends of the blades 5, a supporting plate or bridge 11 is bolted or riveted to the blades 5. These blades have their rear ends connected together by means of a bridge 12 of sheet metal, and in order that this bridge may be stiffened at its middle portion without greatly increasing its weight, a wooden plate 13 may be riveted thereto. A driver's seat 14 is supported on a standard 15 which has its lower end turned horizontally and seated on the plate 13. A central strut 16 has its front end bolted to the upper end of the standard which includes the blade 9, and its rear end portion curves downward and terminates in a horizontal apertured portion which may be seated upon the plate 13 or upon a foot extending forward from the lower end of the standard 15. A bolt 17 extends through the bridge 12—13, through said foot and through the apertured rear end of the strut 16.

The plate 13 has a rearward extension 18, and a substantially U shaped member 19 is riveted or otherwise secured to this extension and combined therewith to form a foot-rest on which the driver may rest his feet when sitting on the seat 14, and on which the driver may bear, at intervals, when walking behind the device, to depress the rear end of the device, for assisting its front end in riding over a stone or other obstacle. A separating or dividing member 20 is supported by forward extensions of the U-shaped member 19 and by the plate 13, for a purpose which will presently appear.

A pair of adjustable guiding blades 21 and 22 are provided, and each of these blades is preferably formed integrally with a shank 28. A bearing 23 is provided for each shank 28 and each bearing 23 is provided with a screw threaded stud 24. The stud 24 on the front bearing 23 extends through an upward extension or flange 25 of the plate or bridge 11, while the rear stud 24 extends through an aperture in the standard 15. One or more nuts 26 may be provided on the studs 24, in locked engagement with one another and with their apertured supports so that these bearings 23 may be easily adjusted, and are normally held rigid with their supports. An apertured plate 27 may be positioned between the rear bearing 23 and its support 15 so as to brace and strengthen the latter at the point weakened by the aperture therethrough. Set screws 29 or other appropriate means may be employed for securing the shanks 28 in rigid relation with their supports. It will be seen that as earth and brush pass over the blades 5, and start to pass over the bridge 12—13, the separating member 20 prevents such earth and brush from coming in contact with the threaded bolts 17 and 24, thereby protecting these elements against the rusting tendencies which would be caused by their contact with earth.

In order that the vertical blade 9 and horizontal blades 5 may be held in rigid relation with one another, a pair of forwardly and upwardly converging struts 30 are provided, the upper ends of these struts being secured to the upper end of the blade member 9 by means of the same bolt that secures the forward end of the strut 16 to the member 9, the lower ends of these struts being secured intermediate the front and rear ends of the blades 5 so as to coact with the strut 16 and bridge 12—13 for keeping the blades 5 substantially straight.

Deflector arms 31 are secured to the upper end portion of the member 9 and extend outward beyond the cutting edges of the blades 5 so as to bend the larger bushes or young trees away from the edges of the blades 5 and thereby render the cutting of these larger bushes comparatively easy, also deflecting the bushes away from the device after they have been cut.

Figure 4:
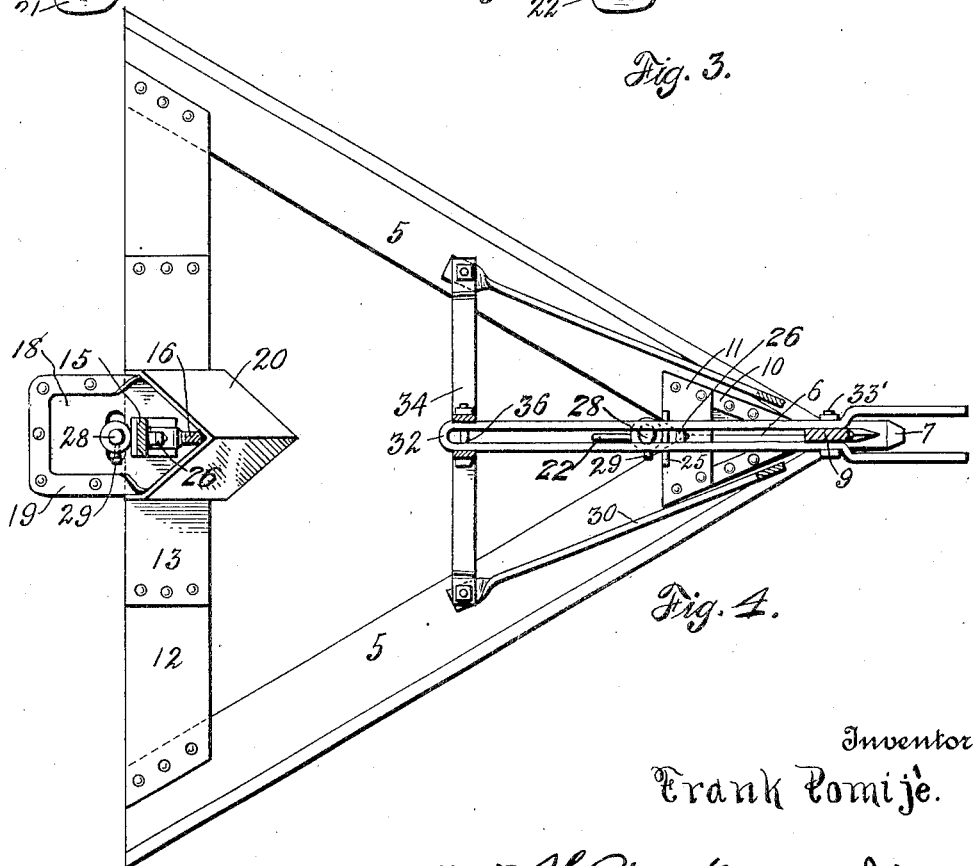
Fig. 4 is a horizontal sectional view, the section being taken along the line 4—4 of Fig. 3.

A tongue member 32 is pivotally connected at 33' to the member 9, and a second tongue member 33 may be secured to the front end of the member 32 by means of bolts. The member 33 is preferably of wood while the member 32 may be formed of a single length of strap iron bent substantially into U-shape, as shown in Fig. 4, and the rear end of this tongue member 32 is adjustably engaged with the upper ends of a pair of upwardly and inwardly converging bars 34, these bars being provided with a series of apertures 35 in which a bolt 36 may be interchangeably seated, this bolt also passing through the rear end of the tongue member 32. It will be seen, therefore, that the angle of the tongue may be changed by moving the bolt 36 from one to another of the holes 35, the tongue member 32 swinging on the pivot 33' for this purpose.

A draft element or hitching element 37 may be secured to the blade member 9 as indicated in the drawings.

In operating this device, horses or other draft animals may be hitched to the elements 33 and 37, and when driven along, the device is dragged on the ground to be cleared or leveled, the cutting edges of the blades 5 coming in contact with brush and tussocks of grass and sod and cutting them so that they either pass over the blades 5 or are pushed laterally thereby so as to fill any depressions over which the blades 5 pass. The material that passes over the blades 5 is pushed by the bridge 12—13 so as to fill depressions between the formerly high parts or tussocks that have been cut off.

Although I have described this embodiment of my invention very specifically, it is not intended to limit this invention to the exact details of construction and arrangement of parts, but changes may be made within the scope of the inventive ideas as implied and claimed.

What I claim as my invention is:

1. The combination of a pair of substantially horizontal blades having their cutting edges diverging rearwardly, a substantially vertical cutting blade having its lower end rigidly united with the front ends of said horizontal blades, a tongue-member pivotally connected to said vertical blade, and a pair of struts secured to and converging upward from said horizontal blades and being adjustably secured to said tongue member.

2. The combination of a pair of substantially horizontal blades having their cutting edges diverging rearwardly, a substantially vertical cutting blade having its lower end rigidly united with the front ends of said horizontal blades, a tongue member connected to said vertical blade and being angularly adjustable relative to said blades in a vertical plane, struts connecting the top of said vertical blade with the respective horizontal blades, and a hitching element connected to said vertical blade subjacent to said tongue-member.

3. The combination of a pair of substantially horizontal and forwardly movable cutting blades joined together at their front ends and diverging rearward, and a vertically and angularly adjustable ground penetrating guiding blade having its lower end subjacent to said cutting blades, whereby the operation of said cutting blades can be controlled substantially as described.

4. The combination of a pair of substantially horizontal and forwardly movable cutting blades joined together at their front ends and diverging rearward, and a pair of ground penetrating guiding blades subjacent to said horizontal blades, one of said guiding blades being disposed at and supported by the front part of said horizontal blades, the other guiding blade being disposed between and supported by the rear part of said horizontal blades.

5. The combination of a pair of substantially horizontal and forwardly movable cutting blades having their edges diverging from their front toward their rear ends, a bridge supported by said blades, a ground-engaging guide and an adjustable bearing supported on said bridge and having said guide adjustably secured thereto.

6. The combination of a pair of substantially horizontal and forwardly movable cutting blades having their edges diverging from their front toward their rear ends, a bridge supported by said blades, a ground-engaging guide, an adjustable bearing supported on said bridge and having said guide adjustably secured thereto, and a shield supported by said bridge in front of said adjustable bearing, said shield comprising two surfaces which are forwardly and downwardly inclined and which converge forwardly and meet to form a separating edge, for the purpose specified.

7. The combination of a pair of rearwardly diverging blades, a substantially vertical blade secured to and extending up from said rearwardly diverging blades, a bridge secured to and supported by the diverging blades, a strut secured to the middle part of said bridge and having its front end secured to the upper part of said vertical blade, a pair of struts each connected to the middle part of one of said diverging blades, said pair of struts being connected to the upper part of said vertical blade, a pair of upwardly converging struts secured to said rearwardly diverging blades, and a tongue-member adjustably secured to said vertical blade and upwardly converging struts.

In testimony whereof I have hereunto set my hand.

FRANK POMIJÈ.